Feb. 25, 1941.  R. KURTZ  2,233,016
THEODOLITE AND THE LIKE
Filed Aug. 21, 1940  2 Sheets-Sheet 1
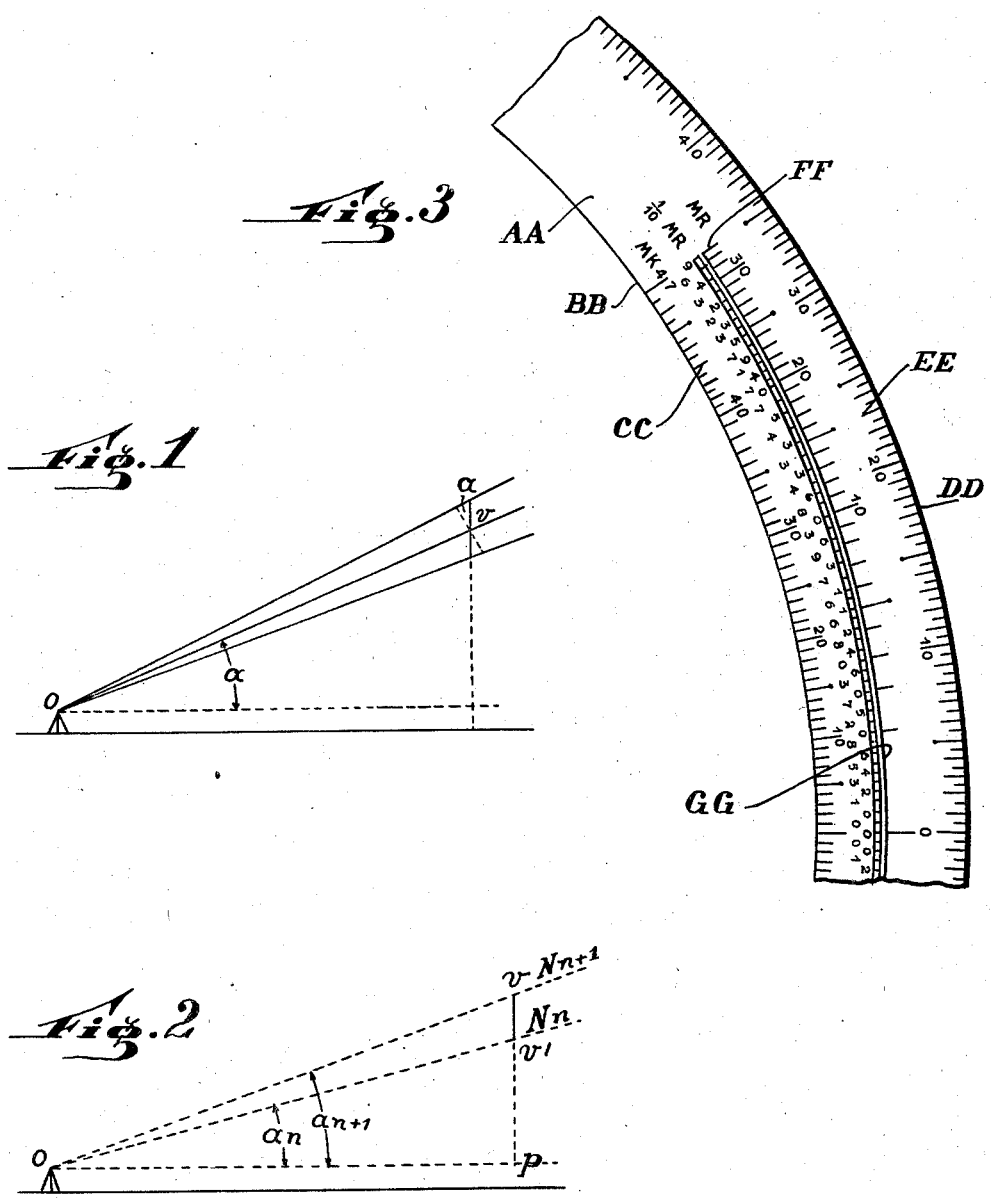
INVENTOR
Roberto Kurtz
BY
ATTORNEYS

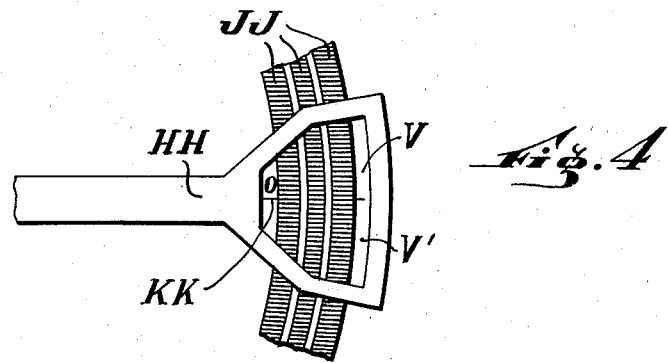
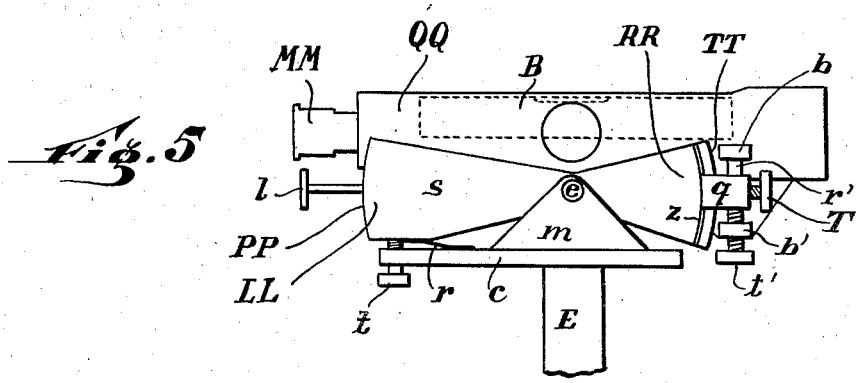
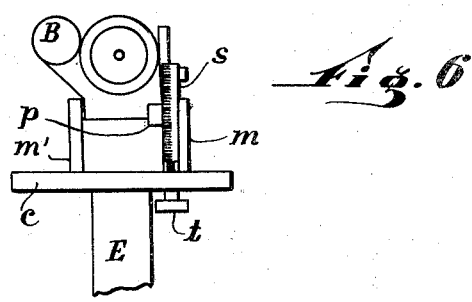

Patented Feb. 25, 1941

2,233,016

UNITED STATES PATENT OFFICE 2,233,016

THEODOLITE AND THE LIKE

Roberto Kurtz, Tucuman, Argentina

Application August 21, 1940, Serial No. 353,584
In Argentina November 7, 1939

4 Claims. (Cl. 33—71)

The present invention relates to theodolites, levelling instruments and the like, and more particularly to an improved system of graduation of the vertical limb of surveying instruments whereby the results of field observations in surveying can be obtained by direct arithmetic calculations without having to resort to trigonometrical or other tables.

In the drawings Fig. 1 is a diagram illustrating the use of an instrument with a standard scale.

Fig. 2 is a diagram illustrating certain features of the present invention.

Fig. 3 is a portion of a theodolite sector with scales according to the present invention.

Fig. 4 is a fragmentary side view showing the indicating arm in position on the scale, and Figs. 5 and 6 are, respectively, an end view and a side elevation of a levelling tachymeter modified according to the present invention.

Hitherto the procedure adopted and the apparatus used have been based on the presence of a set of three horizontal stadia wires which mark out three heights on the image of the staff. The center wire indicates the point at which the optical axis of the telescope cuts the staff and the two outer readings give a magnitude which serves as a basis for the estimation and calculation of the distance between the staff and the theodolite or level.

When the visual axis cuts the staff horizontally, the distance is obtained by multiplying the difference in reading of the two outer stadia wires, which difference will hereinafter be called the stadigraphic reading, by a factor which is characteristic for each telescope, and is known as the multiplication constant. Some earlier types of instrument required an addition constant to be used as well, but this has been suppressed in modern instruments.

When the visual axis directed to the staff is not horizontal, the stadigraphic reading is greater than that for the real distance between instrument and staff, owing to the obliquity of the latter with respect to the optical axis of the telescope, as seen in Fig. 1. The product of this reading by the multiplication constant of the telescope, therefore, gives an apparent distance which has to be subjected to trigonometrical operations before the real figures can be obtained.

The principal object of the present invention is the elimination of these calculations and, therefore, they will here be briefly recapitulated in order to assist in an understanding of the present invention. In this discussion it is to be understood that the horizontal and vertical distances between two points are those between the axis of the instrument and the point in which the optical axis cuts the staff.

Fig. 1 shows the position of an object viewed from a theodolite at O at an angle $a$. To obtain the distance $Ov$ the apparent distance must be multiplied by $\cos a$. The vertical and horizontal distances are obtained by multiplying the distance $Ov$ by $\cos a$ and $\sin a$ respectively. Hence the following two formulae are derived:

$$V = LM \sin a \cos a \quad (1)$$
$$H = LM \cos^2 a \quad (2)$$

in which L is the stadigraphic reading, M the multiplication constant of the telescope, V is the vertical and H the horizontal distance between the two points.

The operator reads the angle $a$ in degrees and minutes on the theodolite, notes the figures in his field book, and afterwards in his office must use trigonometrical tables to ascertain the values of $\sin a$ and $\cos a$ and deduce those of H and V or else use special surveyor's tables.

The system of measurement according to the present invention is based on the creation of two new trigonometric functions which will be identified as factor K and factor R and are defined as will emerge from the following discussion:

If in Equation 1 we write $$\sin a \cos a = K \quad (3)$$

said equation becomes $$V = LMK \quad (4)$$

Let a series of values $K_1, K_2, K_3 \ldots$ of K be taken such that $$MK_1 = N_1; \quad MK_2 = N_2; \quad MK_3 = N_3$$

where $N_1, N_2, N_3$ represent a conventional scale of values chosen so as to facilitate the calculations. To the values $K_1, K_2, K_3$ correspond certain values $a_1, a_2, a_3$ of the angle $a$, which can be calculated from Equation 3.

If now, on the circle of the theodolite, lengths of arc equal to $a_1, a_2, a_3$ are measured, and are marked, not with degrees and minutes but with the numbers $N_1, N_2, N_3$, the operator will not read the angle but a number and by multiplying the stadigraphic reading by this number will obtain directly the vertical distance between the two points according to Equation 4.

The horizontal distance can be obtained in an analogous manner. If in Equation 2 we put $$\cos^2 a = 1 - R \quad (5)$$

we have $$H = LM - LMR \quad (6)$$

For every value $K_1, K_2, K_3$ of $K$ there will be a corresponding value for $R$, say $R_1, R_2, R_3$ connected with the former by Equations 3 and 5. Once the conventional scale of values of factor $K$ has been selected, the corresponding values of $R$ are calculated and the products thereof by $M$ are set off along the vertical limb of the instrument concentrically with the values of $MK$ so that the operator reads both values at once. He will then multiply the stadigraphic reading by $MR$ to obtain the difference between the apparent and the horizontal distances between the two points.

It should be borne in mind that the scale of values of factor $K$ although conventional cannot be entirely arbitrary. There is a limitation which is best explained with reference to Fig. 2. The lines $ON_n$ and $ON_{n+1}$ represent visual axes directed along two consecutive divisions of the vertical circle of the theodolite. If these visual axes are cut by a vertical plane passing through the point at which the staff has to be located, the distance $vv'$ must be smaller than the height of the staff. Otherwise, one visual axis might pass below and the other above without cutting the staff and in such circumstances it would be impossible to operate since the divisions of the arc corresponding to the scale of values of $MK$ do not admit of sub-division either into decimal fractions or aliquot parts. A vernier cannot be applied in this system because for equal increments of $MK$ the increments of the length of the arcs are not equal.

On the other hand, it is a matter of indifference at which point the staff is cut by the visual axis, neither is it essential that the three stadia wires should appear across the image. It is sufficient that the latter be intercepted by the middle wire and one of the outer wires, because the difference in height between these two stadia wires when multiplied by two gives what has been defined as the stadigraphic reading. This relationship is not rigorously accurate, but sufficiently close for tacheometer work.

The maximum distance at which operation is possible with a staff of type A may be found as follows:

If $D$ is the distance between the theodolite and the staff, we have $$vp = D \sin a_{n+1}; \quad Op = D \cos a_{n+1}; \quad v'p = Op \tan a_n$$

Therefore, the condition to be fulfilled is given by the following inequality:

$$D(\sin a_{n+1} - \cos a_{n+1} \cdot \tan a_n) < A \quad (7)$$

The theory on which the present invention is based has now been stated and it will be seen that it consists essentially in:

1. The creation of two new trigonometrical functions which I call factor $K$, which is, for a given angle the product of the sine by the cosine and for that angle gives the number by which the apparent distance between two points as observed on the readings of the telescope has to be multiplied to obtain the vertical height between them, and factor $R$ which is equal to the square of the sine for the same given angle and gives the number by which the apparent distance as read with the stadia wires must be multiplied in order to obtain the difference between it and the horizontal distance between the same two points.

2. The division of the arc of circumference into lengths of arc corresponding to the scales of the values of factors $K$ and $R$.

In practice, the first points to be decided when constructing a theodolite according to my novel system is the selection of the scale of values $K_1, K_2, K_3$, etc. corresponding to the series $N_1, N_2, N_3$, etc.

It is obvious that the ideal would be to take the series of the natural numbers as values for $N$, since it would then be sufficient to multiply the stadigraphic reading by a whole number in order to obtain the vertical distance between two points, which is the most important and the most frequent operation in tacheometry. It would be necessary to ascertain subsequently, whether this scale fulfils the condition given in Expression 7 and to make interpolations where necessary.

The values of factor $K$ are deduced from the equalities $$K_1 = 1/M; \quad K_2 = 2/M; \quad K_3 = 3/M; \text{ etc.}$$

in which $M$ is the constant of multiplication of the telescope.

The lengths of arc are given by the general Formula 3

$$\sin a \cdot \cos a = K$$

and, remembering that in any angle $$\cos a = \sqrt{1 - \sin^2 a}$$

and substituting, we have $$\sin a \sqrt{1 - \sin^2 a} = K$$

Putting $\sin a$ under the radical, squaring, collecting terms on the left, and changing all the signs, we have $$\sin^4 a - \sin^2 a + K^2 = 0$$

which is a quadratic equation the roots of which are $$\sin a = \pm \sqrt{\tfrac{1}{2} \pm \sqrt{\tfrac{1}{4} - K^2}}$$

The negative sign of the first root corresponds to angles in the third and fourth quadrant of the circumference, which are of no interest. The positive sign of the second group corresponds to angles between 45° and 90°. Although there is no objection to engraving these angles on the circle of the theodolite, in practice no angles greater than 35° are used in tacheometry, nor are such angles to be recommended, because the obliquity of the visual axis on the staff is such that for very small deviations from the vertical, considerable errors occur in the stadigraphic reading. Hence, neglecting angles greater than 45°, the formula becomes $$\sin a = \sqrt{\tfrac{1}{2} - \sqrt{\tfrac{1}{4} - K^2}} \quad (7a)$$

Substituting in this expression the values obtained for $K_1, K_2, K_3$, etc. we obtain the sines of the angles $a_1, a_2, a_3$, etc.

The value of factor $R$ is deduced from Equations 3 and 5

$$R = 1 - \cos^2 a = \sin^2 a; \quad K = \sin a \cdot \cos a$$

dividing, we get $$R = K \tan a \quad (8)$$

Substituting in this expression the values obtained for $K_1, K_2, K_3$, etc. and those of the tangents of the respective arcs $a_1$, $a_2$, $a_3$, etc., the values of $R_1$, $R_2$, $R_3$, are obtained.

*Example*

With a telescope the constant of multiplication of which is greater than 100, very homogeneous scales of values of factor K may be applied and these would permit of operation at distances which may be as far as we please.

Nevertheless, I have preferred by way of example to calculate the scale for a telescope where $M=100$ since this is the type which is usually made at the present day. As may be seen in the table given below, the natural series of numbers has been taken for the values of N up to 40 which corresponds to the angle of 26°33'. The distances of operation as determined by Expression 7 for a 4 m. staff are found to be:

At an angle of 5°46' up to 370 meters
At an angle of 15° up to 330 meters
At an angle of 26°33' up to 220 meters From this value of factor K, interpolations had to be made of half units as shown in the table in order to keep the distance of operation in the neighbourhood of 220 metres, up to the angle of 35°2'. If it is remembered that in practical surveying, probably 90% of the operations are effected with angles less than 5°46' and that probably not even in 1% of the cases is the angle of 26°33' exceeded, it is evident that this scale of values for factor K is fully satisfactory.

As regards the distance, in general operations are conducted with points not further away than 100 or 150 metres and in these circumstances the staff may be intercepted by two consecutive visual axes and sometimes by three.

*Table of the values of the corresponding angles calculated by Equation 7a*

| Values of K | Angle | Values of K | Angle | Values of K | Angle | Values of K | Angle |
|---|---|---|---|---|---|---|---|
| 0.01 | 0°34' | 0.15 | 8°44' | 0.29 | 17°44' | 0.410 | 27°30' |
| 0.02 | 1°9' | 0.16 | 9°20' | 0.30 | 18°26' | 0.415 | 28°1' |
| 0.03 | 1°43' | 0.17 | 9°56' | 0.31 | 19°10' | 0.420 | 28°33' |
| 0.04 | 2°18' | 0.18 | 10°33' | 0.32 | 19°54' | 0.425 | 29°6' |
| 0.05 | 2°52' | 0.19 | 11°10' | 0.33 | 20°39' | 0.430 | 29°39' |
| 0.06 | 3°27' | 0.20 | 11°48' | 0.34 | 21°25' | 0.435 | 30°14' |
| 0.07 | 4°1' | 0.21 | 12°25' | 0.35 | 22°12' | 0.440 | 30°49' |
| 0.08 | 4°36' | 0.22 | 13°3' | 0.36 | 23°1' | 0.445 | 31°26' |
| 0.09 | 5°11' | 0.23 | 13°42' | 0.37 | 23°51' | 0.450 | 32°5' |
| 0.10 | 5°46' | 0.24 | 14°21' | 0.38 | 24°43' | 0.455 | 32°45' |
| 0.11 | 6°21' | 0.25 | 15°0' | 0.39 | 25°37' | 0.460 | 33°28' |
| 0.12 | 6°56' | 0.26 | 15°40' | 0.400 | 26°33' | 0.465 | 34°13' |
| 0.13 | 7°32' | 0.27 | 16°20' | 0.405 | 27°1' | 0.470 | 35°2' |
| 0.14 | 8°8' | 0.28 | 17°2' | | | | |

The values of factor R have been calculated by Formula 8. In the following table, the series of values MR corresponding to those of MK are given for the example under consideration in which, of course, since $M=100$, the values represent 100R and 100K.

| 100K | 100R | 100K | 100R | 100K | 100R | 100K | 100R | 100K | 100R | 100K | 100R |
|---|---|---|---|---|---|---|---|---|---|---|---|
| 1 | 0 | 11 | 1.2 | 21 | 4.6 | 31 | 10.8 | 40.5 | 20.7 | 45.5 | 29.3 |
| 2 | 0 | 12 | 1.5 | 22 | 5.1 | 32 | 11.6 | 41.0 | 21.4 | 46.0 | 30.4 |
| 3 | 0.1 | 13 | 1.7 | 23 | 5.6 | 33 | 12.4 | 41.5 | 22.1 | 46.5 | 31.6 |
| 4 | 0.2 | 14 | 2.0 | 24 | 6.1 | 34 | 13.3 | 42.0 | 22.9 | 47.0 | 32.9 |
| 5 | 0.3 | 15 | 2.3 | 25 | 6.7 | 35 | 14.3 | 42.5 | 23.7 | | |
| 6 | 0.4 | 16 | 2.6 | 26 | 7.3 | 36 | 15.3 | 43.0 | 24.5 | | |
| 7 | 0.5 | 17 | 3.0 | 27 | 7.9 | 37 | 16.4 | 43.5 | 25.3 | | |
| 8 | 0.6 | 18 | 3.4 | 28 | 8.6 | 38 | 17.5 | 44.0 | 26.3 | | |
| 9 | 0.8 | 19 | 3.8 | 29 | 9.3 | 39 | 18.7 | 44.5 | 27.2 | | |
| 10 | 1.0 | 20 | 4.2 | 30 | 10.0 | 40 | 20.0 | 45.0 | 28.2 | | |

In the values for 100R, decimals of the second order have been neglected since in tacheometry lengths smaller than a decimeter are not taken into account for horizontal distances. The vertical distances calculated with the values of 100K, are strictly accurate.

As previously stated, about 90% of the surveying operations are effected with angles less than 5°46' for which the values of 100K are always digital. As can be seen from the table, the corresponding values for 100R likewise contain only one significant digit, therefore almost all the work of the operator in the field is reduced to making multiplications by single digits.

As regards the mechanical devices, I have shown in Fig. 3, on an enlarged scale a portion of the circle AA for vertical angles of a theodolite. Said circle AA has marked on its inner edge BB the lengths of arc CC corresponding to the scale of values of MK for a telescope of $M=100$, as in the foregoing example. On the outer edge DD, the circle bears the usual divisions EE of the circumference in degrees and minutes.

Between these two scales CC and EE, the values of MR are engraved as shown at FF. The complete units are shown in the same way as in the case of the other two scales, and the fractions are given by numbers located between the two scales CC and FF and indicating tenths of a unit. They may conveniently be shown alternately in two concentric sets in order to save space and avoid having to make the diameter of the circle AA excessively large. To read the value of MR corresponding to any value of MK, the complete units which appear in the drawings to the right of the line GG showing the values of MR are taken together with the numbers of tenths shown against this same line.

Fig. 4 shows the special arrangement of the horizontal member HH for this particular case, said horizontal member HH being the one which in all theodolites carries the zero of origin of the measurement of the vertical angles. In the spaces V, V' the verniers are usually located but they have been omitted from the drawings, and on the other side of the scales JJ, that is to say, on the side nearer to the axis of the theodolite, a plain line KK indicates the zero of the values of factor K. As the three scales are very close together, the lenses or optical system used for reading the angles may also be used for reading the other scale markings.

From the foregoing, it follows that the new system can be applied to any type of universal theodolite without loss of any of its present applications. The measurement of vertical angles in degrees and minutes is retained for astronomic observations, geodetic triangulations and the like and a further possibility or facility for tacheometry operations has been added.

In Fig. 5, a levelling tachymeter is shown diagrammatically. This apparatus is chiefly intended for taking levels, but when operating in broken country it may be used for tacheometry according to my novel system.

In the drawings, the lower part of the instrument has been omitted, since it will not differ from that of all instruments of this kind. It consists generally of a casting which may bear a circle for the measurement of horizontal angles and which rests on three levelling screws. In the centre of such a base, there is a cylindrical cavity in which the shaft E fits rotatably.

The said shaft E is integral with a cast plate C from which two risers $m$, $m'$ project, which act as supports for a pin $e$, about which the body of the telescope can be moved in a vertical plane. On the pivot $e$ is mounted a double sector plate S, the end LL of which nearest to the eyepiece MM terminates in a cylindrical surface PP on which the scales of the values of factor K and factor R are engraved in a manner analogous to that already described. From the body of the telescope QQ a member $p$ projects which bears a simple line (Fig. 6) serving as an index for the reading of the scale of values of factor K. The member $p$ may carry a lens $l$ shown in Fig. 5, but omitted from Fig. 6.

The position of the sector plate S which as stated is mounted on pin $e$ and may move about it within a narrow angular range, is controlled by the screw $t$ and the spring $r$.

The end RR of the sector plate S remote from the eyepiece MM also terminates in a cylindrical surface TT over which a fixing member $q$ is adapted to slide. Said member $q$ is maintained in connected relationship with the sector plate S by means of projections (not shown) which engage with a pair of grooves, one of which is shown at $z$ in Fig. 5. Projecting from the body of the telescope QQ is an arm $b$ which carries a spring $r'$ urging member $q$ downwardly, and an arm $b'$ through which a screw $t'$ passes whereby the member $q$ may be urged upwardly against the pressure of the spring $r'$. A screw T passes through the member $q$ and engages with the cylindrical surface TT of the sector plate S. When the screw T is slackened, the member $q$ moves with the body of the telescope during the latter's angular movements in a vertical plane and when said screw T is tightened the position of the telescope is substantially fixed and can only be varied micrometrically by means of the tangential screw $t'$.

Alongside the telescope is fixed a level B shown in broken lines in Fig. 5 which serves to check the horizontality of the telescope and the correctness of the adjustments already described.

In using the instrument, the telescope is oriented towards the staff and is then moved into horizontal position and fixed therein by means of the fixing screw T. The operator then examines the scale of values of factor K through lens $l$ and brings the index line on the member $p$ into coincidence with the zero of the scale by adjusting the tangential screw $t'$. Thereafter, the bubble of the level P is brought to center by actuating the screw $t$ which as will be obvious from the drawings will cause the sector S and the body of the telescope to move together.

Once the apparatus has been levelled, the fixing screw T is slackened and the telescope is directed towards the staff at about half its height. In this position the fixing screw T is again tightened and the scale of values of factor K inspected. If the index line is found to lie between two consecutive divisions of the scale, the tangential screw $t'$ is turned until said index line is caused to coincide with the nearest of said two consecutive divisions. Thereafter, the numbers corresponding to the factors K and R are entered in the field book and the staff reading is taken.

Supposing that with a visual axis MK=7, an upper stadia wire reading of 3.25 metres and a lower stadia wire reading of 1.62 metres has been taken. What has hereinbefore been called the stadigraphic reading will then be 163 cms. and therefore, the vertical distance as defined in this specification, is given by the product of 163 cms. and 7, the result being therefore 11.4 meters.

To find the horizontal distance as hereinbefore defined, the stadigraphic reading is multiplied by MR which, in the present instance is 0.5 and we shall have 163 meters, less 163 cms. multiplied by 0.5, that is, neglecting fractions less than $1/10$, 162.2 meters.

If a theodolite is used, the method of operation is analogous. In any preliminary adjustment, the operator will adhere to the standard practice holding for any type of universal theodolite, since as we have seen, the new system does not affect the essential arrangements common to all such instruments in any way. After sighting the telescope onto a point about half the height of the staff, the zero index is brought opposite one of the divisions of the scale of values of the factor K. The readings for the staff and the other operations are performed in a manner identically with that used for the levelling tachymeter.

Below is appended an example of how to enter the operations and notes in the field book, on the supposition that the observer was posted at a point marked 9 on the map, the particulars of which were already known and from which a point 8 of a previous survey has been taken and five new points Nos. 10 to 14 have likewise been measured.

| Points | Horiz. angle | Vertical | | Readings | | | Diffce. L | Vert. dist. LMK | Horiz. dist. LM-LMR | Heights | |
|---|---|---|---|---|---|---|---|---|---|---|---|
| | | MK | MR | Middle | Upper | Lower | | | | Instrument | Ground |
| 9 | | | | | | | | | | 98.70 | |
| 8 | 3°20′ | −4 | 0.2 | 1 10 | 1 95 | 0 25 | 170 | −6.80 | 169.7 | | 90.80 |
| 10 | 80°3′ | 1 | 0 | 1 85 | 2 30 | 1 40 | 90 | 0.90 | 90.0 | | 97.75 |
| 11 | 142°5′ | 40.5 | 20.7 | 2 10 | 2 65 | 1 55 | 110 | 44.55 | 87.2 | | 141.15 |
| 12 | 210°31′ | 9 | 0.8 | 1 92 | 2 67 | 1 17 | 150 | 13.50 | 148.8 | | 110.28 |
| 13 | 250° | 0 | 0 | 3 20 | 3 90 | 2 50 | 140 | 0 | 140.0 | | 95.50 |
| 14 | 281°13′ | −7 | 0.5 | 1 38 | 1 78 | 0 98 | 80 | −5.60 | 79.6 | | 91.72 |

I claim:
1. In theodolites and the like surveying instruments comprising a telescope having a constant multiplication M, mounted to be rotated in a vertical plane adjacent an arcuate scale bearing member extending over at least a portion of a vertical circle, and provided with three parallel stadia wires at least two of which in practice cut the image of a staff on which the telescope is trained, said staff being at a real horizontal distance H and a real vertical distance V from the point of observation, that improvement which consists in providing along the scale member, a vertical distance scale divided into arcuate lengths, the successive divisions of which are marked with the successive numbers N of a conventionally chosen series $N_1, N_2, N_3 \ldots$, the lengths of the successive arcs, $a$, being determined by the equation $$\sin a = \sqrt{\tfrac{1}{2} - \sqrt{\tfrac{1}{4} - K^2}}$$

where $K=N/M$, and a horizontal distance scale which indicates for each successive value of N the corresponding value of MR where $R=K \tan a$, whereby the real vertical and horizontal distances may be obtained from the readings by simple arithmetical operations V being equal to LN and H to LM $(1-R)$, where L is twice the intercept on the image of the staff between two successive stadia wires.

2. In theodolites and the like surveying instruments comprising a telescope having a constant of multiplication M, mounted to be rotated in a vertical plane adjacent an arcuate scale-bearing member extending over at least a portion of a vertical circle, and provided with three parallel stadia wires at least two of which in practice cut the image of a staff on which the telescope is trained, said staff being at a vertical distance V above the horizontal plane including the point of observation, that improvement which consists in providing along the scale bearing member a vertical distance scale divided into arcuate lengths, the successive divisions of which are marked with the successive numbers N of a conventionally selected series $N_1, N_2, N_3 \ldots$, the lengths of the successive arcs, $a$, being determined by the equation $$\sin a = \sqrt{\tfrac{1}{2} - \sqrt{\tfrac{1}{4} - K^2}}$$

where $K=N/M$, whereby the vertical distance may be determined from the readings by simple arithmetical operations, V being equal to LN where L is twice the intercept on the image of the object between two successive stadia wires.

3. In theodolites and the like surveying instruments comprising a telescope having a constant of multiplication M, mounted to be rotated in a vertical plane adjacent an arcuate scale bearing member extending over at least a portion of a vertical circle, and provided with three parallel stadia wires at least two of which in practice cut the image of a staff on which said telescope is trained, said staff being at a real horizontal distance H from the point of observation, that improvement which consists in providing along the scale bearing member a horizontal distance scale the successive divisions of which are equal to and marked with the corresponding values of $R=K \tan a$ where the arc $a$ is determined by the equation $$\sin a = \sqrt{\tfrac{1}{2} - \sqrt{\tfrac{1}{4} - K^2}}$$

K being equal to N/M and N being the successive values of a conventionally chosen series $N_1, N_2, N_3 \ldots$, whereby the true horizontal distance may be obtained from the readings by simple arithmetical operations, H being equal to LM $(1-R)$ where L is twice the intercept on the image of the object between two successive stadia wires.

4. A levelling tachymeter comprising a stand, a base rotatably mounted on said stand, a pair of supports projecting from said base on the side thereof remote from the stand, a pin supported in said supports, a telescope unit having a multiplication factor M and three parallel stadia wires at least two of which in practice cut the image of a staff on which said telescope unit is trained, said unit being rotatably mounted on said pin, a double sector plate having cylindrical end surfaces mounted on said pin, a pair of spaced arms projecting laterally from the same side of the telescope unit in the neighborhood of the end thereof remote from the eye-piece, a zero index member projecting from said telescope unit and contiguous to the cylindrical surface nearest to said eye-piece, screw and spring means adjusting the center plate relatively to said zero index member, a fixing member located between said spaced arms and having a pair of projections engaging in grooves formed on opposite faces of the corresponding end of the sector plate, spring means between one of said arms and said fixing member, an adjusting screw passing through the other of said arms and contacting said fixing member, a fixing screw passing through said fixing member and adapted to engage the corresponding cylindrical surface whereby to lock the sector plate to the telescope unit, and a vertical distance scale and a horizontal distance scale provided on the cylindrical surface nearest said eye-piece, said vertical distance scale being divided into arcuate lengths the successive divisions of which are marked with the successive number N of a conventionally chosen series $N_1, N_2, N_3 \ldots$, the lengths of the successive arcs $a$ being determined by the equation $$\sin a = \sqrt{\tfrac{1}{2} - \sqrt{\tfrac{1}{4} - K^2}}$$

where $K=N/M$, and the horizontal distance scale indicating for each successive value of N the corresponding value of MR where $R=K \tan a$, whereby the real vertical and horizontal distances may be derived from the readings by simple arithmetical operations, the vertical distance being equal to LN and the horizontal distance to LM $(1-R)$ where L is twice the intercept on the image of the object between successive stadia wires.

ROBERTO KURTZ.